United States Patent
Abou-El-Ella et al.

(10) Patent No.: US 9,143,924 B1
(45) Date of Patent: Sep. 22, 2015

(54) SEGMENTED CUSTOMIZATION PAYLOAD DELIVERY

(71) Applicant: Sprint Communications Company L.P., Overland Park, KS (US)

(72) Inventors: Hassan Abou-El-Ella, Overland Park, KS (US); Bret D. Sumner, Lawrence, KS (US)

(73) Assignee: Sprint Communications Company L.P., Overland Park, KS (US)

(*) Notice: Subject to any disclaimer, the term of this patent is extended or adjusted under 35 U.S.C. 154(b) by 107 days.

(21) Appl. No.: 14/010,518

(22) Filed: Aug. 27, 2013

(51) Int. Cl.
*H04M 3/00* (2006.01)
*H04W 8/22* (2009.01)

(52) U.S. Cl.
CPC ...................................... *H04W 8/22* (2013.01)

(58) Field of Classification Search
CPC .. H04W 4/001; H04W 8/245; H04M 1/72525
USPC .................. 455/418, 419; 370/473, 478–479
See application file for complete search history.

(56) References Cited

U.S. PATENT DOCUMENTS

| | | |
|---|---|---|
| 6,131,024 A | 10/2000 | Boltz |
| 7,165,191 B1 | 1/2007 | Vakrat |
| 7,266,371 B1 | 9/2007 | Amin et al. |
| 7,493,111 B2 | 2/2009 | Knowles |
| 7,817,988 B2 | 10/2010 | Kruis et al. |
| 7,904,895 B1 | 3/2011 | Cassapakis et al. |
| 8,107,926 B2 | 1/2012 | Goto |
| 8,185,101 B1 | 5/2012 | Wiseman et al. |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,571,536 B2 | 10/2013 | Urbanek |
| 8,612,967 B1 | 12/2013 | Delker |
| 8,626,165 B1 | 1/2014 | Narasimhan et al. |
| 8,666,383 B1 | 3/2014 | Mauer et al. |
| 8,825,039 B2 | 9/2014 | Mizuguchi |
| 8,909,291 B1 | 12/2014 | Spanel et al. |
| 9,026,105 B2 | 5/2015 | Shipley et al. |
| 9,042,877 B1 | 5/2015 | Ghoshal et al. |

(Continued)

FOREIGN PATENT DOCUMENTS

| | | |
|---|---|---|
| WO | WO2012078753 A1 | 6/2012 |
| WO | WO2013169983 A1 | 11/2013 |

(Continued)

OTHER PUBLICATIONS

Advisory Action dated Dec. 17, 2014, U.S. Appl. No. 13/622,234, filed Sep. 18, 2012.

(Continued)

*Primary Examiner* — Wayne Cai

(57) ABSTRACT

A method of sending a customization payload to a mobile communication device comprises identifying, by the mobile communication device, the bandwidth of a bearer channel, wherein the bearer channel provides a connection between the mobile communication device and a server, sending, from the mobile communication device to the server, an alert string selected based upon the identifying, and receiving, by the mobile communication device, a customization payload identified based on the alert string, wherein the customization payload is received from the server.

19 Claims, 8 Drawing Sheets

(56) References Cited

U.S. PATENT DOCUMENTS

| | | |
|---|---|---|
| 2002/0091931 A1 | 7/2002 | Quick, Jr. et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0079855 A1 | 4/2005 | Jethi et al. |
| 2005/0085222 A1 | 4/2005 | Przybilski et al. |
| 2005/0119001 A1 | 6/2005 | Watanabe |
| 2005/0188262 A1 | 8/2005 | Rosenman et al. |
| 2005/0197098 A1 | 9/2005 | Trossen |
| 2006/0025151 A1* | 2/2006 | Karaoguz et al. ............ 455/455 |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0082655 A1 | 4/2007 | Link, II et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0318547 A1 | 12/2008 | Ballou, Jr. et al. |
| 2009/0061840 A1 | 3/2009 | Fleischman et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156209 A1 | 6/2009 | Franklin et al. |
| 2009/0239518 A1 | 9/2009 | Feuillette |
| 2009/0247124 A1 | 10/2009 | De Atley et al. |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0203864 A1 | 8/2010 | Howard |
| 2010/0207742 A1 | 8/2010 | Buhot et al. |
| 2010/0222047 A1* | 9/2010 | Vanderlinden et al. ....... 455/418 |
| 2010/0262638 A1 | 10/2010 | Fitzgerald |
| 2010/0291898 A1 | 11/2010 | Sanding et al. |
| 2010/0311404 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0081885 A1* | 4/2011 | Sennett et al. ................ 455/405 |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0208338 A1 | 8/2011 | Eteminan et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0046951 A1 | 2/2013 | Jones |
| 2013/0065578 A1 | 3/2013 | Raleigh et al. |
| 2013/0072168 A1 | 3/2013 | Colucciello et al. |
| 2013/0085914 A1 | 4/2013 | McPherson et al. |
| 2013/0111461 A1 | 5/2013 | Zubas et al. |
| 2013/0198567 A1 | 8/2013 | Ahmed et al. |
| 2013/0222395 A1 | 8/2013 | Blas, Jr. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2014/0045483 A1 | 2/2014 | Whidden |
| 2014/0080467 A1 | 3/2014 | Urbanek |
| 2014/0113610 A1 | 4/2014 | Ramprasad Satish et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0373184 A1 | 12/2014 | Mahaffey et al. |
| 2015/0065105 A1 | 3/2015 | Masterson et al. |
| 2015/0111564 A1 | 4/2015 | Urbanek |
| 2015/0111565 A1 | 4/2015 | Urbanek |

FOREIGN PATENT DOCUMENTS

| | | |
|---|---|---|
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |

OTHER PUBLICATIONS

Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.

(56) References Cited

OTHER PUBLICATIONS

First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Faipp Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
Faipp Pre-Interview Communication dated Jul. 16, 2014, U.S. Appl. No. 13/744,861, filed Jan. 18, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, International Application No. PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014, PCT/US14/16650, filed on Feb. 16, 2014.
Urbanek, Robert E., "Delivery of Branding Content and Customizations to a Mobile Communication Device", filed , 201, International Serial No. PCT/US14/56778.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
Faipp Pre-Interview Communication dated Mar. 26, 2015, U.S. Appl. No. 14/522,586 filed Oct. 24, 2014.
Faipp Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.

(56) References Cited

OTHER PUBLICATIONS

Notice of Allowance dated Mar. 26, 2015, U.S. Appl. No. 13/763,434, filed Feb. 8, 2013.
Faipp Pre-Interview Communication dated Mar. 12, 2015, U.S. Appl. No. 13/972,827, filed Aug. 21, 2013.
Notice of Allowance dated Jan. 22, 2015, U.S. Appl. No. 13/899,566, filed May 21, 2013.
Faipp Pre-Interview Communication dated Apr. 15, 2015, U.S. Appl. No. 14/060,712, filed Nov. 20, 2013.
Faipp Pre-Interview Communication dated Apr. 1, 2015, U.S. Appl. No. 14/010,522, filed Aug. 27, 2013.
Faipp Pre-Interview Communication dated Apr. 3, 2015, U.S. Appl. No. 14/010,523, filed Aug. 27, 2013.
Faipp Pre-Interview Communication dated Mar. 10, 2015, U.S. Appl. No. 14/010,524, filed Aug. 27, 2013.
Faipp Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Ghoshal, Jagannath, et al., "Multi-Step Mobile Device Initiation with Intermediate Partial Reset," filed Aug. 21, 2013, U.S. Appl. No. 13/972,827.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 131972,827, filed Aug. 21, 2013.
Notice of Allowance dated May 29, 2015, U.S. Appl. No. 14/085,474, filed Nov. 20, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.

\* cited by examiner

SEGMENTED CUSTOMIZATION PAYLOAD DELIVERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

After its manufacture, a mobile communication device may be delivered to a retail location where it may be purchased by a mobile communication device user. Following its purchase, the mobile communication device may be activated by the mobile communication device user. Once activated, the mobile communication device may have access to a network. While activated with access to the network, the mobile communication device may engage in periodic handshaking with base transceiver stations in which information may be sent to and/or received from the base transceiver stations. The mobile communication device may receive customization information from a server and may use its network access to pull down the customization information.

SUMMARY

In an embodiment, a method of sending a customization payload to a mobile communication device is disclosed. The method comprises identifying, by the mobile communication device, the bandwidth of a bearer channel, wherein the bearer channel provides a connection between the mobile communication device and a server, sending, from the mobile communication device to the server, an alert string selected based upon the identifying, and receiving, by the mobile communication device, a customization payload identified based on the alert string, wherein the customization payload is received from the server.

In an embodiment, a method of intelligently sending a customization payload to a mobile communication device is disclosed. The method comprises identifying, by the mobile communication device, received portions of a customization package based on markers left by a customization application, sending, from the mobile communication device to a server, an alert string selected based on the identifying, and receiving, by the mobile communication device, a customization payload selected based on the alert string, wherein the customization payload is received from the server.

In an embodiment, a method of intelligently sending a customization payload to a mobile communication device is disclosed. The method comprises selecting an alert string based on at least one of identifying received portions of a customization package based on markers left by a customization application or identifying the bandwidth of a bearer channel of the mobile communication device. The method further comprises sending, from the mobile communication device to a server, the alert string, and receiving, by the mobile communication device, a customization payload from the server based on the alert string.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
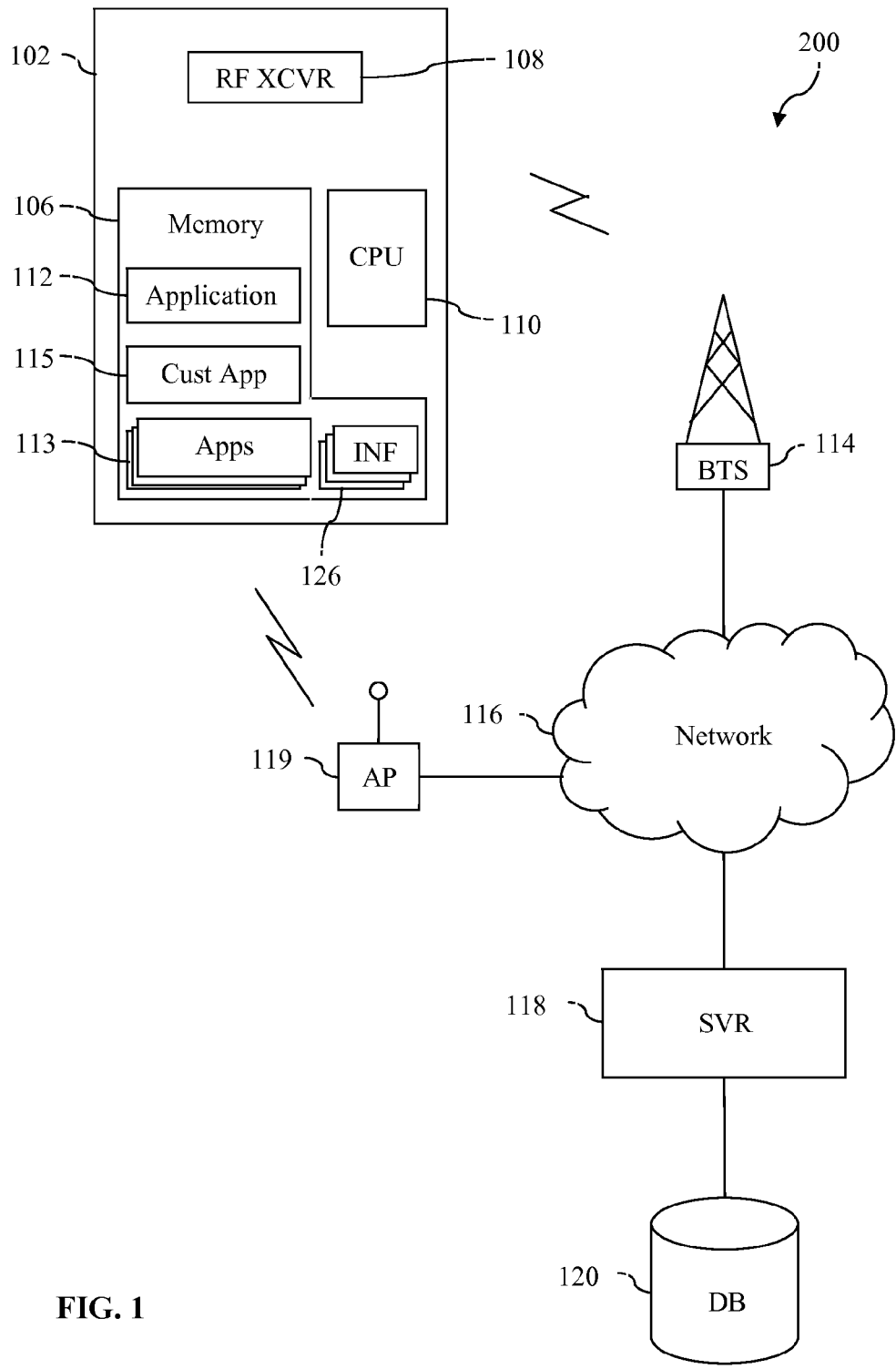
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A mobile communication device may gain access to a network by connecting to a bearer channel. Different networks may comprise different bearer channels, wherein different bearer channels may provide different levels of bandwidth and hence different levels of throughput. The present disclosure teaches identifying and sending an alert string configured to request a customization payload to be sent from a server to the mobile communication device based on the bandwidth of the bearer channel to which the mobile communication device is connected.

The mobile communication device may identify and send an alert string configured to request a first customization payload when the mobile communication device is connected to a first bearer channel, and the mobile communication device may identify and send a different alert string configured to request a second customization payload when the mobile communication device is connected to a second bearer channel, wherein the first customization payload is smaller than the second customization payload when the first bearer channel provides less bandwidth than the second bearer channel. Alternatively, the first customization payload may be larger than the second customization payload when the first bearer channel provides more bandwidth than the second bearer channel.

Thus, different alert strings that request different sized customization payloads may be identified depending on the bandwidth of the bearer channel to which the mobile communication device is connected, wherein greater bandwidth elicits larger customization payloads to be requested. For example, the alert string identified and sent when the mobile communication device is connected to a 1xRTT (Radio Transmission Technology) channel may be configured to request a smaller customization payload than the alert string identified and sent when the mobile communication device is connected to an EV-DO (Evolution Data Optimized) channel, wherein the 1xRTT channel provides less bandwidth than the EV-DO channel.

The customization payload sent to the mobile communication device may comprise a portion of a customization package stored on a server or in a data store. In other words, the server may be configured to access the customization payload, and the customization payload may be stored in a memory of the server or stored in a data store accessible by the server. In some cases, the portion of the customization package may comprise the entire customization package. In some contexts, a customization payload comprising a smaller portion of the customization package may be considered to be smaller than a customization payload comprising a larger portion of the customization package. The customization package may comprise power-on video animations, power-off video animations, wallpaper, a ringtone, a link to an application store, a short code or phone number of customer care center, a short code or phone number of voice mail, one or more applications, one or more widgets, one or more sets of instructions or programs that execute to complete rebranding, customizing, and/or provisioning the mobile communication device, activation information, and/or other information.

In an embodiment, the contents of the customization package may be sent to the mobile communication device in a series of customization payloads, where the extent to which the payload is segmented and/or limited is based on or determined using the available bandwidth of the bearer channel when the bandwidth of the bearer channel to which the mobile communication device is connected is such that it may be undesirable to send a single, large customization payload over the bearer channel to the mobile communication device. In some cases, delivering the customization package as a plurality of segments may reduce expense by allowing one or more segments to be delivered over cheaper or otherwise more efficient channels that may be unavailable for delivery of the customization package as a monolith.

The contents of the customization package may be assigned a relative importance value such that more important pieces may be sent to the mobile communication device in earlier customization payloads. For example, the most important pieces of the customization package may be sent in the first customization payload, and less important pieces may be sent in later customization payloads. In some cases, when the mobile communication device is connected to a bearer channel of sufficient bandwidth, a customization payload comprising the customization package in its entirety may be sent to the mobile communication device in response to receipt of an alert string requesting such.

The present disclosure further teaches intelligently requesting a customization payload based on markers left behind by a customization application, wherein the markers are configured to indicate customization changes made by the customization application. In some contexts, the markers may be said to indicate progress toward a complete download of the customization package. In an embodiment, a customization application may leave behind markers to indicate customization changes that it has made, wherein customization changes may comprise downloading and/or otherwise installing contents of the customization package and/or other items on the mobile communication device. The markers may allow the mobile communication device to avoid re-downloading and/or re-installing items that have already been downloaded and/or installed by the customization application. An alert string configured to request a customization payload from a server may be identified based on the markers left by the customization application, wherein the customization payload may comprise a portion of a customization package as described above.

In an embodiment, the mobile communication device may identify an alert string configured to request the portion of the customization package that it has not yet received. For example, the markers may indicate that one half of the customization package has already been downloaded on the mobile communication device. In that case, the mobile communication device may identify an alert string configured to request the half of the customization package that has not yet been downloaded. In some cases, the alert string may be identified based on a combination of both identifying the bandwidth of a bearer channel to which the mobile communication device is connected and on identifying, based on markers left by the customization application, portions of the customization package that have already been downloaded.

For example, when the markers left by the customization application indicate that half of the customization package has yet to be received by the mobile communication device, and the bandwidth of the bearer channel to which the mobile communication device is connected is capable of supporting a customization payload comprising the entire customization package, an alert string configured to request the un-received half of the customization package may be identified. Alternatively, when the markers left by the customization application indicate that half of the customization package has yet to be received by the mobile communication device, and the bandwidth of the bearer channel to which the mobile communication device is connected is only capable of supporting a customization payload comprising a quarter of the customization package, an alert string configured to request half of the un-received half of the customization package, i.e. a quarter of the customization package, may be identified.

It is anticipated that identifying alert strings configured to request portions of a customization package to be sent from a server to a mobile communication device based on at least one of identifying the bandwidth of a bearer channel to which the mobile communication device is connected and identifying markers left behind by a customization application may allow the mobile communication device to operate more efficiently and may provide greater user satisfaction by allowing the user to access basic functionality more quickly. Identifying alert strings based on identifying bearer channel bandwidth may allow the mobile communication device to identify a desirably sized customization payload to request. For example, when on a bearer channel of low bandwidth, the mobile communication device may request multiple, smaller customization payloads to be sent rather than one large customization payload. The smaller customization payloads may be received quickly while the large customization payload may warrant a slow download process that slows down the mobile communication device. As discussed above, identifying markers left behind by a customization application may help the mobile communication device to run more efficiently by helping the mobile communication device to avoid redundant behavior (e.g., re-downloading payloads).

Turning now to FIG. 1, a communication system 200 is described. In an embodiment, the communication system 200 comprises a mobile communication device 102, a base transceiver station (BTS) 114, a network 116, a server 118, a wireless access point (AP) 119, and a data store 120. The mobile communication device 102 comprises a radio frequency transceiver 108 (RF XCVR), a processor 110 (CPU), and a memory 106. The memory 106 comprises an application 112, a plurality of applications 113 (Apps), a customization application (Gust App) 115, and information 126 (INF). The mobile communication device 102 may connect to the network 116 by connecting to a bearer channel via the radio frequency transceiver 108. In an embodiment, the mobile communication device 102 may comprise a mobile phone, a personal digital assistant (PDA), a media player, a laptop computer, a notebook computer, a tablet computer, a pager, a personal navigation assistant, a smart phone, a feature phone, or something else.

In an embodiment, the application 112 may be configured to determine the bandwidth provided by the bearer channel to which the mobile communication device 102 is connected. Different bearer channels may provide different bandwidths and hence provides different throughput rates. For example, a 1xRTT (Radio Transmission Technology) channel may provide up to about 144 kilobits per second (kbps), while an EV-DO (Evolution Data Optimized) channel may provide up to about 3.1 megabits per second (Mbps). Other channels, such as Long Term Evolution (LTE) channels, may provide more bandwidth than EV-DO provides. The application 112 may identify an alert string based on the determined bandwidth of the bearer channel to which the mobile communication device 102 is connected, wherein the alert string may be configured to request a customization payload from the server 118. The server 118 may be an Open Mobile Alliance Device Management (OMA DM) server or some other server. The customization payload that may be sent from the server 118 to the mobile communication device 102 in response to receiving the alert string may comprise a portion of a customization package stored on the server 118 or in the data store 120. It should be understood that while embodiments discussed below describe the customization package as being stored on the server 118, the customization package may be alternatively described in substantially similar embodiments as being stored in the data store 120. The server 118 may communicate with the data store 120 via the network 116.

In an embodiment, the customization package may comprise at least three of power-on video animations, power-off video animations, wallpaper, a ringtone, a link to an application store, a short code or phone number of customer care center, a short code or phone number of voice mail, one or more applications, one or more widgets, one or more sets of instructions or programs that execute to complete rebranding, customizing, and/or provisioning the mobile communication device 102, activation information, and/or other information. The portion of the customization package sent to the mobile communication device 102 in the customization payload may comprise the customization package in its entirety, or alternatively, the portion of the customization package sent to the mobile communication device 102 may comprise a limited portion of the customization package, wherein the limited portion of the customization package may comprise some portion of the customization package less than the entire customization package. For example, the limited portion of the customization package may comprise one tenth of the customization package, one quarter of the customization package, one third of the customization package, one half of the customization package, two thirds of the customization package, three quarters of the customization package, or some other fractional portion of the customization package.

The mobile communication device 102 may be configured to create one or more alert strings in response to information obtained by the application 112 or in response to something else. Alternatively, one or more different alert strings may be contained in the information 126. Each alert string may be configured to request a customization payload of a predetermined size. For example, the memory 106 may comprise a first alert string that may be configured to request a customization payload from the server 118 that comprises one third of the customization package stored on the server 118, a second alert string that may be configured to request a customization payload from the server that comprises one half of the customization package stored on the server 118, and a third alert string that may be configured to request a customization payload that comprises the entire customization package stored on the server 118. In the example given, the memory 106 may further comprise one or more other alert strings, wherein the other alert strings may be configured to request customization payloads of sizes other than the three sizes discussed above. Alternatively, the other alert strings may be configured to request customization payloads of the same sizes as the three sizes listed above but that comprise different contents. For example, the memory 106 may comprise three alert strings each configured to request a different one third of the customization package. In an embodiment, the alert strings may be formatted at Open Mobile Alliance Device Management (OMA DM) alert strings.

In an embodiment, the alert strings may be configured to indicate to the server 118 the bandwidth of the bearer channel to which the mobile communication device 102 is connected. The server 118 may then identify an appropriately sized portion of the customization package to send in the customization payload based on the bandwidth information. For example, if the mobile communication device 102 is connected to a low bandwidth bearer channel, the server 118 may identify and send a smaller portion of the customization package than would be sent if the mobile communication device 102 was connected to a high bandwidth bearer channel. In some contexts, indicating the bandwidth of the bearer channel to which the mobile communication device 102 is connected such that the server 118 may identify and send a customization payload comprising a portion of the customization package stored on the server 118 may be considered requesting the customization payload comprising the portion of the customization package. In an embodiment, the application 112 may continue to identify and send alert strings configured to request customization payloads until the entire customization package has been delivered to the mobile communication device 102.

In an embodiment, the contents of the customization package stored on the server 118 may be assigned a relative importance value and/or rank such that more important and/or higher ranked pieces may be sent to the mobile communication device 102 in earlier customization payloads. For example, the most important pieces of the customization package may be sent in a first customization payload, and less important pieces may be sent in later customization payloads. In some cases, when the mobile communication device 102 is connected to a bearer channel of sufficient bandwidth, a customization payload comprising the customization package in its entirety may be sent to the mobile communication device 102 in response to receipt of an alert string requesting such.

The customization package stored on the server 118 may be divided into segments configured to be sent in customization payloads to the mobile communication device 102 in a predetermined order according to importance. For example, in the case of three segments, a first, most important segment may be the first segment sent to the mobile communication device 102 in response to receipt of an alert string requesting a customization payload. A second segment of intermediate importance may be sent next in response to receipt of another alert string, and a third, least important segment may be sent last in response to receipt of a third alert string.

Segments of high importance may be segments comprising customization information used to establish basic operation of the mobile communication device 102. For example, placing a phone call may be a basic operation of the mobile communication device 102, and segments comprising customization information used to enable that functionality may be given high importance. In some cases, the more integral a piece of customization information is to enabling a basic operation such as a phone call, the higher importance the segment containing it may be given. For example, a segment comprising a coverage map may be given a higher importance than a segment comprising a wallpaper media file.

In an embodiment, the first segment of the customization package may comprise a network access identifier, a mobile directory number, coverage maps, other things, or combinations thereof. Coverage maps may comprise wireless coverage information e.g. preferred roaming lists and other lists. The second segment of the customization package may comprise carrier legal statements (e.g., terms and conditions), multimedia preloaded responses, ringtones, wallpaper, other things, or combinations thereof. The third segment of the customization package may comprise animation updates, ringtones, user guidelines, and/or other customization information. Alternatively, these customization elements may be incorporated into other segments. For example, in an embodiment, a user's guide may be incorporated into the first segment of the customization package so that a user may read or obtain helpful usage instructions earlier in the customization cycle. There may be tradeoffs between sending low priority customization elements over low cost communication channels to save money versus completing the customization quickly to maintain customer satisfaction.

In some cases, customization payloads received by the mobile communication device 102 may comprise instructions detailing how to proceed with requesting further customization payloads. For example, in the case of three segments described above, the first, most important segment may comprise instructions configured to elicit at least one more alert string to be sent to the server 118 to request another segment of the customization package. Alternatively, when the mobile communication device 102 is connected to a bearer channel of sufficient bandwidth, the mobile communication device 102 may receive a customization payload that comprises the customization package in its entirety, wherein the customization payload further comprises instructions indicating that the entire customization package has been received and additional alert strings configured to request customization payloads that comprise portions of the customization package need not be sent to the server 118.

In an embodiment, the bandwidth of the bearer channel to which the mobile communication device 102 is connected may be checked constantly, at periodic time intervals, at predetermined times, or at some other time. In some cases, the periodic time interval after which the bandwidth of the bearer channel to which the mobile communication device 102 is connected is checked may be every second, every minute, every five minutes, every ten minutes, or some other time interval. In some cases, the bandwidth of the bearer channel to which the mobile communication device 102 is connected may be checked on the hour, at midnight, at noon, at 1:00 am, at 2:00 am, at 3:00 am, at 11:00 pm, at a time indicated by a user of the mobile communication device 102, or at some other time. Checking the bandwidth of the bearer channel to which the mobile communication device 102 is connected may be done by the application 112 or by something else.

In an embodiment, a predetermined threshold bandwidth may be established as a bandwidth value large enough to allow the mobile communication device 102 to receive a portion of the customization package without being significantly slowed. In some contexts, slowing of the mobile communication device 102 such that a user notices the slowing, interfering with the running of other applications, freezing the mobile communication device 102, downloading a portion of the customization package over a period of time greater than a predetermined time limit designated for the download of the portion of the customization package, or other slowing of the mobile communication device 102 may be considered significant slowing of the mobile communication device 102. There may be a plurality of threshold bandwidths that correspond to different portions of the customization package. For example, the customization package may comprise three portions and each portion may be assigned a different one of the plurality of threshold bandwidths. The threshold bandwidths for different portions may be different. Larger portions of the customization package may be assigned larger threshold bandwidths.

In some cases, the mobile communication device 102 may be limited from requesting certain portions of the customization package due to being connected to a bearer channel providing bandwidth that does not meet the threshold bandwidths set for the certain portions of the customization package. When connected to such a bearer channel, the alert strings configured to request the certain portions described above may not be sent to the server 118, thus a customization payload comprising said portions may not be sent to the mobile communication device 102. The mobile communication device 102 may be configured to request portions of the customization package whose threshold bandwidths are met by the bearer channel of the mobile communication device 102.

In an embodiment, the mobile communication device 102 may be configured to request portions of the customization package that it has been limited from requesting after remaining connected to a bearer channel that does not meet the threshold bandwidths set for the portions of the customization package for a predetermined amount of time. It may be the case that the mobile communication device 102 is still connected to the bearer channel that does not meet the threshold bandwidths set for the certain portions of the customization package at the time of the request, thus the mobile communication device 102 may be slowed while attempting to receive the portions of the customization package it was previously limited from requesting.

In an embodiment, the mobile communication device 102 may request the portions of the customization package that it has been limited from requesting after one hour of being connected to the bearer channel that does not meet the threshold bandwidths set for the certain portions of the customization package, after two hours of being connected to the bearer channel that does not meet the threshold bandwidths set for the certain portions of the customization package, after 6 hours of being connected to the bearer channel that does not meet the threshold bandwidths set for the certain portions of the customization package, after 9 hours of being connected to the bearer channel that does not meet the threshold bandwidths set for the certain portions of the customization package, after 12 hours of being connected to the bearer channel that does not meet the threshold bandwidths set for the certain portions of the customization package, after 24 hours of being connected to the bearer channel that does not meet the threshold bandwidths set for the certain portions of the customization package, after two days of being connected to the bearer channel that does not meet the threshold bandwidths set for the certain portions of the customization package, after a week of being connected to the bearer channel that does not meet the threshold bandwidths set for the certain portions of the customization package, or after some other period of time of being connected to the bearer channel that does not meet the threshold bandwidths set for the certain portions of the customization package.

Alternatively, the mobile communication device 102 may request the portions of the customization package that it has been limited from requesting at a predetermined time. In an embodiment, the mobile communication device 102 may request the portions of the customization package that it has been limited from requesting at night, at noon, during the day, at 8:00 pm, at 9:00 pm, at 10:00 pm, at 11:00 pm, at 12:00 am, at 1:00 am, at 2:00 am, at 3:00 am, at 4:00 am, at 5:00 am, at 6:00 am, or at some other time. In some cases, the mobile communication device 102 may request the portions of the customization package that it has been limited from requesting in response to user input, in response to inactivity on the mobile communication device 102, or in response to something else.

In some cases, the mobile communication device 102 may be limited from requesting certain customization payloads when not connected to a bearer channel that provides bandwidth greater than or equal to a predetermined value. For example, the mobile communication device 102 may be limited from requesting a customization payload that comprises the customization package in its entirety when not connected to a bearer channel with a bandwidth of at least 10 Mbps. In this case, the mobile communication device 102 may be limited from requesting the customization payload that comprises the customization payload in its entirety when the mobile communication device 102 is connected to a 1xRTT bearer channel. Alternatively, the mobile communication device 102 may be permitted to request the customization payload that comprises the customization package in its entirety when connected to an LTE bearer channel or Wi-Fi connection that provides at least 10 Mbps of bandwidth.

In an embodiment, the wireless access point (AP) 119 may provide a Wi-Fi connection to the mobile communication device 102. In some cases, the mobile communication device 102 may be configured to refrain from requesting certain portions of the customization package until it is connected to a Wi-Fi connection. Large files that aren't integral to the basic functionality of the mobile communication device 102 may not be requested until the mobile communication device 102 is connected to a Wi-Fi connection. For example, a portion of the customization package comprising large animation files may not be requested until the mobile communication device 102 identifies that it has access to a Wi-Fi connection. Wi-Fi may provide an amount of bandwidth that meets or exceeds the threshold bandwidth for sending large portions of the customization package or the entire customization package.

The mobile communication device 102 may said to be limited from requesting a customization payload when the application 112 refrains from selecting an alert string configured to request the customization payload from the server 118. The application 112 may be configured to select alert strings based on the bandwidth of the bearer channel to which the mobile communication device 102 is connected, as described above, and may refrain from selecting the alert string when the mobile communication device 102 is not connected to a bearer channel of greater or equal bandwidth to a predetermined bandwidth at which the application 112 is configured to select the alert string.

The customization application 115 may be configured to make customization changes to the mobile communication device 102. In an embodiment, the customization application 115 may be a device self-service application configured to make customization changes associated with activation of the mobile communication device 102. For example, the customization application 115 may download and/or install a portion of the customization package associated with activation of the mobile communication device 102. Customization changes associated with activation may comprise at least three of providing power-on animations and/or power-off animations, changing wallpaper, changing a ringtone, providing a link to an application store, entering a short code or phone number of customer care center into an address book of the mobile communication device 102, providing a short code or phone number of voice mail, installing one or more applications and/or one or more widgets, and/or executing one or more sets of instructions or programs configured to complete rebranding, customizing, and/or provisioning the mobile communication device 102.

The customization application 115 may be configured to leave markers configured to indicate customization changes that it has made. The application 112 may be configured to identify the markers left by the customization application 115 and select an alert string such that the customization payload requested by the selected alert string will not contain customization matter that has already been downloaded and/or installed by the customization application 115. In an embodiment, the application 112 may identify an alert string based on both markers left by the customization application 115 and the bandwidth of the bearer channel to which the mobile communication device 102 is connected.

In an embodiment, customization changes made in response to receiving a customization payload on the mobile communication device 102 may be made by the application 112 or by something else. In an embodiment, the application 112 may comprise an OMA DM client configured to make customization changes to the mobile communication device 102. Alternatively, the plurality of applications 113 may comprise the OMA DM client. The OMA DM client may be configured to request and receive customization payloads as described hereinabove.

Figure 2:
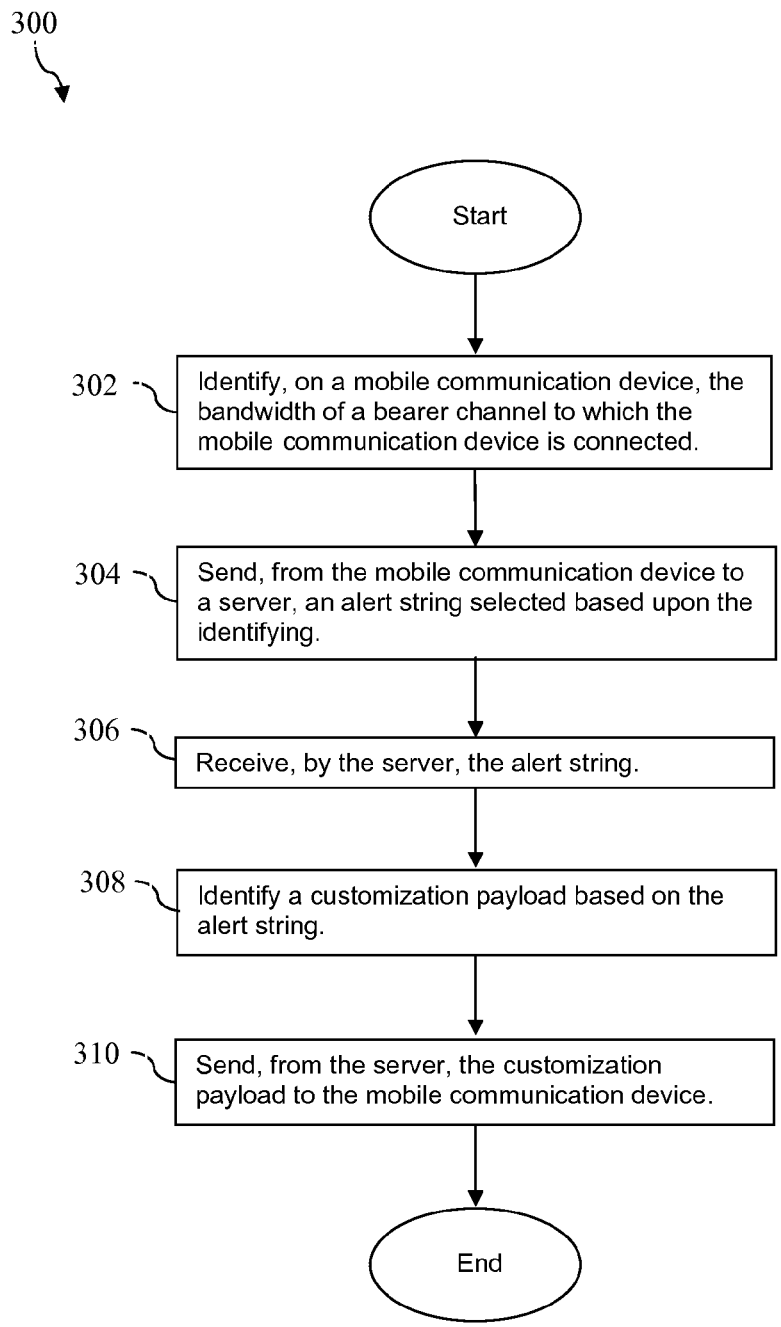
FIG. 2 is a flow chart of a method according to an embodiment of the disclosure.

Turning now to FIG. 2, a method 300 is described. In an embodiment, the method 300 may be implemented by one or more components of the communication system 200 described hereinabove with reference to FIG. 1. At block 302, the bandwidth of a bearer channel to which a mobile communication device is connected may be identified on the mobile communication device. An alert string selected based on the identified bandwidth may be sent at block 304 from the mobile communication device to a server. In an embodiment, the server may be an OMA server and/or an OMA DM server and may have access to a data store as described hereinabove with reference to FIG. 1. The alert string may be received by the server at block 306. A customization payload may be identified at block 308 based on the alert string.

In an embodiment, the identifying may be done by the server. The server may identify the customization payload by matching the alert string to a customization payload stored on the server, wherein there may be one or more customization payloads stored on the server. The one or more customization payloads may be configured to be selected according to size based on the alert string received by the server. For example, the alert string may comprise information about the bandwidth of a bearer channel to which the mobile communication device is connected, and the server may select and send to the mobile communication device a customization payload of a size that may be sent over the bearer channel to which the mobile communication device is connected without significantly slowing the mobile communication device. Alternatively, the server may build a customization payload to send to the mobile communication device in response to receiving the alert string. The customization payload may be built from elements of a customization package stored on the server or in a data store accessible by the server.

At block 310, the customization payload may be sent from the server to the mobile communication device. In an embodiment, the customization payload may comprise substantially similar contents to those described hereinabove with reference to FIG. 1. The mobile communication device may be configured to make customization changes in response to receiving the customization payload and/or the mobile communication device may be configured to respond to instructions contained in the customization payload. For example, the mobile communication device may send to the server another alert string configured to request another customization payload in response to instructions to request another customization payload contained in the customization payload received by the mobile communication device.

It is anticipated that identifying alert strings based on identifying bearer channel bandwidth may allow the mobile communication device to identify a desirably sized customization payload to request. For example, when on a bearer channel of low bandwidth, the mobile communication device may request multiple, smaller customization payloads to be sent rather than one large customization payload. The smaller customization payloads may be received quickly while the large customization payload may warrant a slow download process that slows down the mobile communication device.

Figure 3:
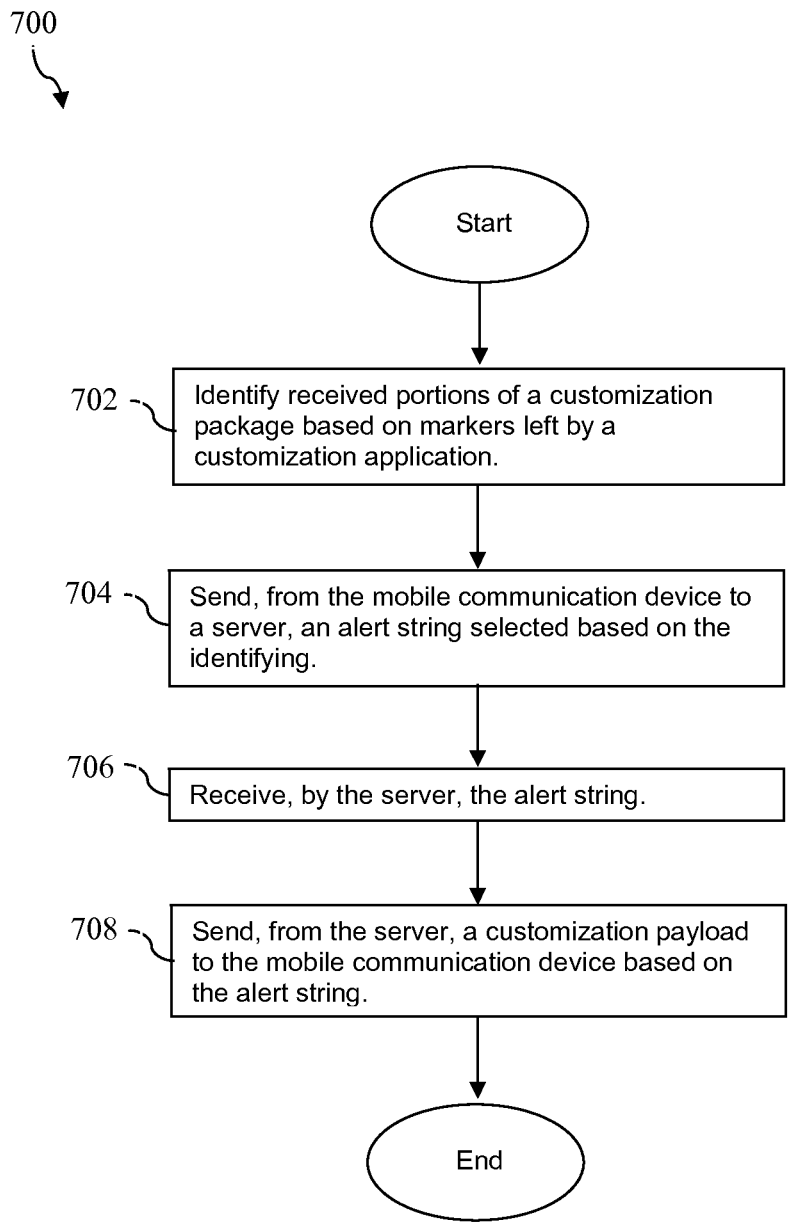
FIG. 3 is a flow chart of a method according to an embodiment of the disclosure.

Turning now to FIG. 3, a method 700 is described. In an embodiment, the method 700 may be implemented by one or more components of the communication system 200 described hereinabove with reference to FIG. 1. At block 702, received portions of a customization package may be identified based on markers left by a customization application. The customization application may be an application configured to make customization changes to the mobile communication device, wherein customization changes may comprise changes as discussed hereinabove with reference to FIG. 1. In an embodiment, the customization application may be a device self-service application.

At block 704, an alert string selected based on the identifying may be sent from the mobile communication device to a server, wherein the alert string may be configured to request a customization payload from the server. It is anticipated that selecting an alert string configured to request a customization payload based on identifying markers left behind by a customization application may help the mobile communication device to run more efficiently by helping the mobile communication device to avoid redundant behavior. The server may receive the alert string at block 706. The server may identify a customization payload based on analysis of the alert string. The analysis may allow the server to determine the bandwidth of a bearer channel to which the mobile communication device is connected, identify a portion of a customization package stored on the server, identify portions of the customization package stored on the server that have already been sent to the mobile communication device, construct a customization payload from the customization package stored on the server, and/or the analysis may allow the server to do something else.

At block 708, a customization payload may be sent from the server to the mobile communication device based on the alert string. In an embodiment, the customization payload may comprise a portion of a customization package stored on the server as described hereinabove with reference to FIG. 1. The mobile communication device may be configured to make customization changes in response to receiving the customization payload and/or the mobile communication device may be configured to respond to instructions contained in the customization payload. For example, the mobile communication device may send to the server another alert string configured to request another customization payload in response to instructions to request another customization payload contained in the customization payload received by the mobile communication device.

Figure 4:
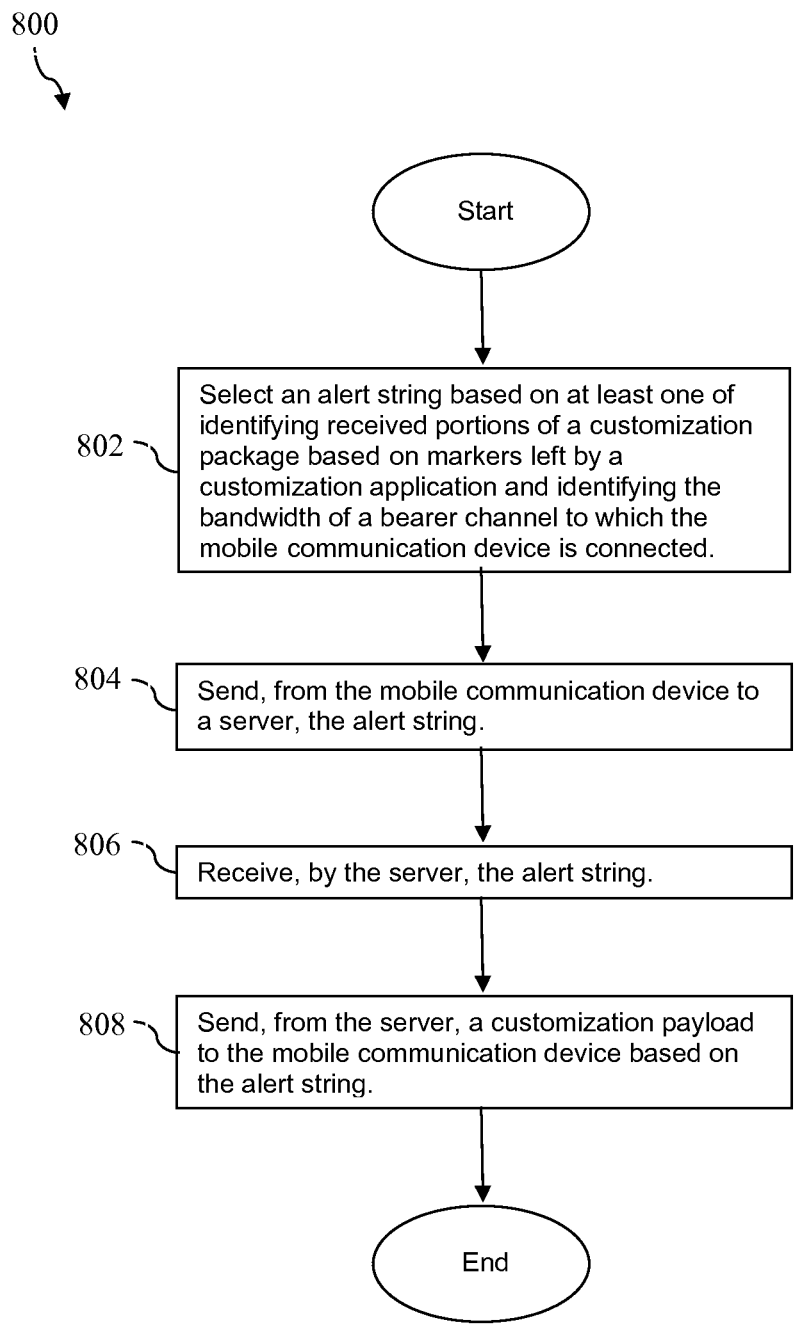
FIG. 4 is a flow chart of a method according to an embodiment of the disclosure.

Turning now to FIG. 4, a method 800 is described. In an embodiment, the method 800 may be implemented by one or more components of the communication system 200 described hereinabove with reference to FIG. 1. At block 802, an alert string may be selected based on at least one of identifying received portions of a customization package based on markers left by a customization application and identifying the bandwidth of a bearer channel to which the mobile communication device is connected. In some cases, the alert string may be selected based on both markers left by the customization application and the bandwidth of the bearer channel to which the mobile communication device is connected.

At block 804, the alert string may be sent from the mobile communication device to a server. The alert string may be received by the server at block 806. A customization payload may be identified and/or created based on an analysis of the alert string. The analysis may allow the server to determine the bandwidth of a bearer channel to which the mobile communication device is connected, identify a portion of a customization package stored on the server, identify portions of the customization package stored on the server that have already been sent to the mobile communication device, construct a customization payload from the customization package stored on the server, and/or the analysis may allow the server to do something else.

In an embodiment, a customization payload of a size suitable for transmission across the bearer channel to the mobile communication device may be assembled. The contents of the customization payload may be taken from the customization package stored on the server, wherein previously unsent pieces of the customization package may be selected for placement in the customization payload. As discussed hereinabove, the contents of the customization package may be ranked, thus when the customization payload may be limited in size, certain pieces of the customization package may be preferentially chosen for placement in the customization payload according to their rank relative to other unsent pieces of the customization package.

At block 808, a customization payload may be sent from the server to the mobile communication device based on the alert string. In an embodiment, the size and/or contents of the customization payload, as discussed hereinabove, may be determined by the alert string.

It is anticipated that identifying alert strings based on at least one of identifying the bandwidth of a bearer channel to which the mobile communication device is connected and identifying markers left behind by a customization application may allow the mobile communication device to operate more efficiently. Identifying alert strings based on identifying bearer channel bandwidth may allow the mobile communication device to identify a suitably sized customization payload to request. For example, when on a bearer channel of low bandwidth, the mobile communication device may request multiple, smaller customization payloads to be sent rather than one large customization payload. The smaller customization payloads may be received quickly while the large customization payload may warrant a slow download process that slows down the mobile communication device. As discussed above, identifying markers left behind by a customization application may help the mobile communication device to run more efficiently by helping the mobile communication device to avoid redundant behavior.

Figure 5:
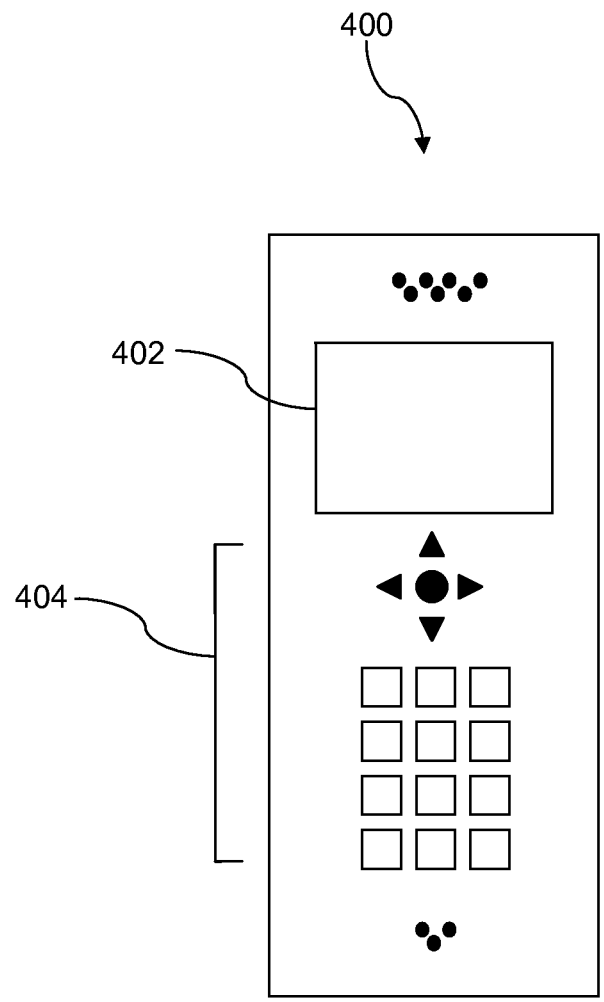
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
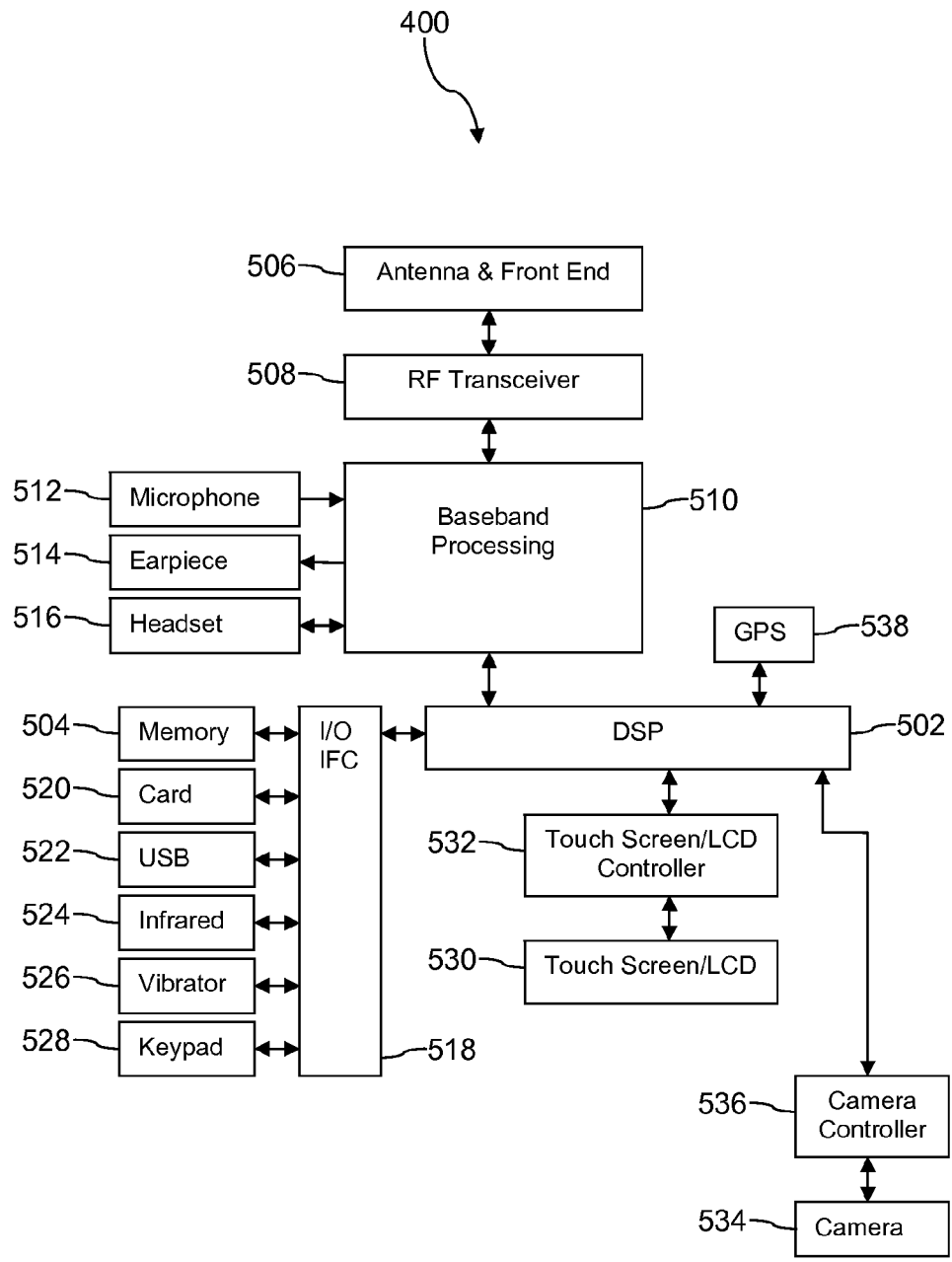
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
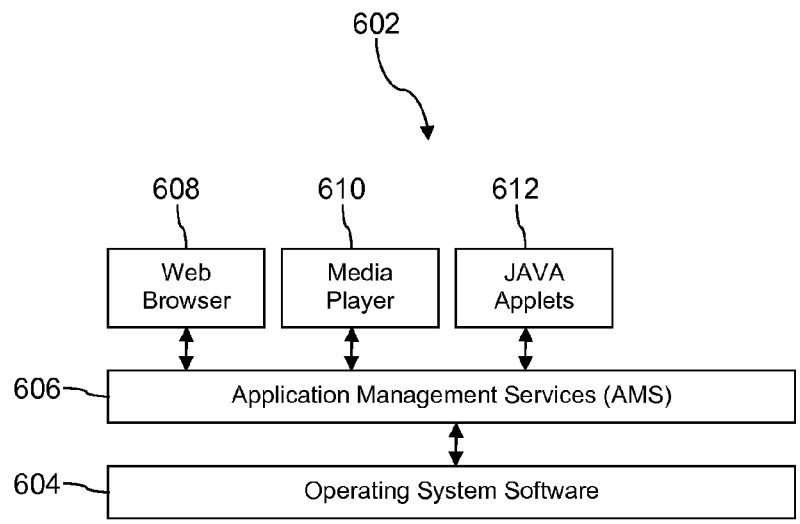
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
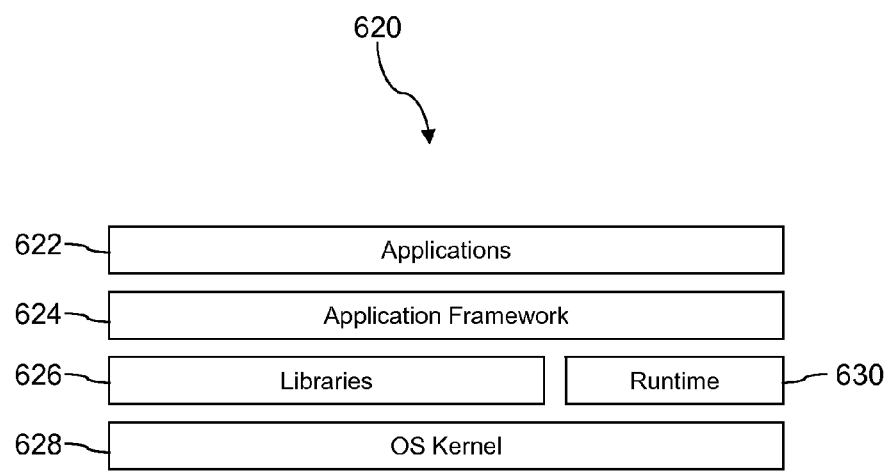
FIG. 7B is a block diagram of another software architecture according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
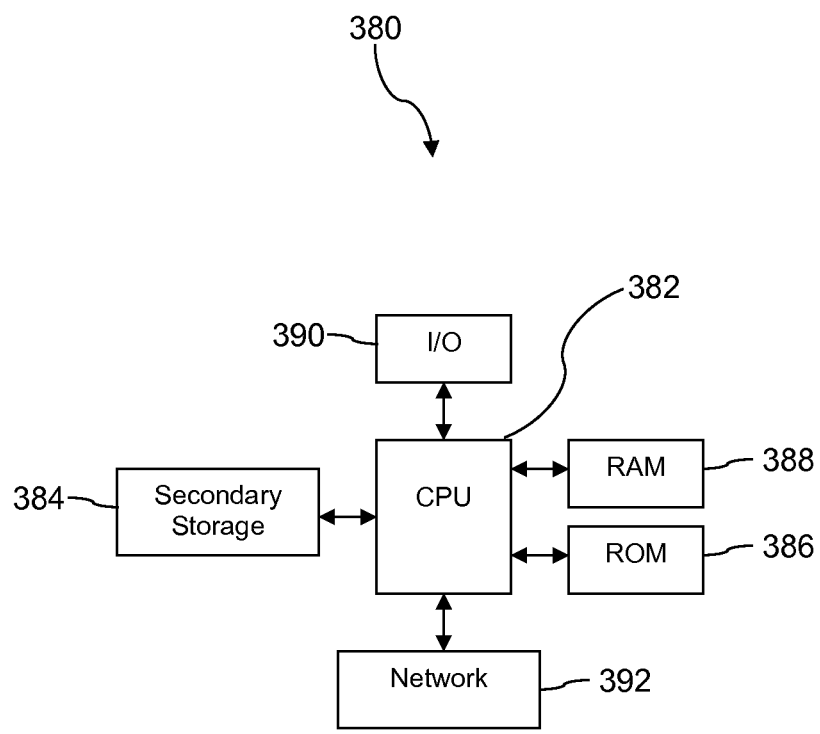
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of sending a customization payload to a mobile communication device, comprising:
    identifying, by an application stored in a non-transitory memory of the mobile communication device, a bandwidth of a bearer channel, wherein the bearer channel provides a connection between the mobile communication device and a server;
    creating, by the application, based upon the identified bandwidth, an alert string;
    sending, from the application to the server, the alert string;
    receiving, by the application from the server over the bearer channel when the mobile communication device is connected to the bearer channel, a first customization payload associated with the alert string, wherein the first customization payload is a portion of a customization package, and wherein the first customization payload comprises customization information to establish a basic operation of the mobile communication device;
    performing the basic operation of the mobile communication device based on receiving the first customization payload;
    establishing a second connection between the mobile communication device and the server over a second bearer channel after performing the basic operation of the mobile communication device;
    selecting, by the application, a second alert string, wherein the second alert string is selected based on at least one of identifying received portions of the customization package or the bandwidth of a second bearer channel;
    sending, by the application to a server, the second alert string; and
    receiving, by the application from the server over the second bearer channel, a second customization payload based on the second alert string, wherein the second customization payload is at least a second portion of the customization package.

2. The method of claim 1, wherein the first customization payload is identified from a plurality of customization payloads each comprising different sized portions of the customization package.

3. The method of claim 2, wherein an alert string selected for a bearer channel with less bandwidth identifies a customization payload comprising a portion of the customization package that is smaller than the portion of the customization package contained in a customization payload identified based on an alert string selected for a bearer channel of greater bandwidth.

4. The method of claim 1, wherein the server is an Open Mobile Alliance (OMA) server.

5. The method of claim 1, wherein the alert string is selected from a plurality of alert strings, wherein different alert strings are configured to request different sized customization payloads.

6. A method of intelligently sending a customization payload to a mobile communication device, comprising:
    identifying, by an application stored in a non-transitory memory of the mobile communication device, a plurality of markers created by a customization application;

identifying, by the application, a plurality of received portions of a customization package based on the identified plurality of markers created by the customization application;

selecting, by the application, an alert string from a plurality of alert strings based on the plurality of received portions of the customization package, wherein each alert string of the plurality of alert strings is configured to request different sized customization payloads;

sending, from the application to a server, the alert string;

receiving, by the application over a bearer channel from the server when the mobile communication device is connected to the bearer channel, a first customization payload selected based on the alert string, wherein the first customization payload comprises customization information to establish at least a basic operation of the mobile communication device;

performing at least the basic operation of the mobile communication device;

establishing a second connection between the mobile communication device and the server over a second bearer channel;

selecting, by the application, a second alert string, wherein the second alert string is selected based on at least one of identifying received portions of the customization package or the bandwidth of a second bearer channel;

sending, by the application to a server, the second alert string; and receiving, by the application from the server over the second bearer channel, and a second customization payload based on the second alert string, wherein the second customization payload is at least a second portion of the customization package.

7. The method of claim 6, wherein the customization application is a Device Self Service (DSS) application.

8. The method of claim 6, wherein the server is an Open Mobile Alliance (OMA) server.

9. The method of claim 6, wherein the alert string is configured to request non-received portions of the customization package.

10. The method of claim 6, wherein the first customization payload comprises non-received portions of the customization package.

11. The method of claim 6, wherein the server is configured to access a plurality of customization payloads each comprising a different portion of the customization package.

12. The method of claim 11, wherein the first customization package comprises at least one of power-on video animations, power-off video animations, wallpaper, a ringtone, a link to an application store, a short code or phone number of customer care center, a short code or phone number of voice mail, one or more applications, one or more widgets, and one or more sets of instructions or programs that execute to complete rebranding, customizing, and/or provisioning the mobile communication device.

13. A method of intelligently sending a customization payload to a mobile communication device, comprising:

establishing a connection between a mobile communication device and a server over a first bearer channel;

selecting, by an application stored in a non-transitory memory of the mobile communication device, a first alert string, wherein the first alert string is selected based on at least one of identifying received portions of a customization package or identifying a bandwidth of the first bearer channel, and wherein the received portions of the customization package are identified based on markers identified by a customization application;

sending, by the application to the server, the first alert string;

receiving, by the application from the server, over the first bearer channel, a first customization payload based on the alert string, wherein the first customization payload comprises customization information to establish at least a basic operation of the mobile communication device;

performing at least the basic operation of the mobile communication device based on receiving the first customization payload;

establishing a second connection between the mobile communication device and the server over a second bearer channel after performing at least the basic operation of the mobile communication device;

selecting, by the application, a second alert string, wherein the second alert string is selected based on at least one of identifying received portions of the customization package or the bandwidth of a second bearer channel of the mobile communication device;

sending, by the application to a server, the second alert string; and receiving, by the application from the server over the second bearer channel, a second customization payload based on the second alert string.

14. The method of claim 13, wherein the server is an Open Mobile Alliance (OMA) server.

15. The method of claim 13, wherein the first alert string is configured to request a portion of the customization package to be sent to the mobile communication device as the first customization payload.

16. The method of claim 15, wherein the portion of the customization package comprises at least one of power-on video animations, power-off video animations, wallpaper, a ringtone, a link to an application store, a short code or phone number of customer care center, a short code or phone number of voice mail, one or more applications, one or more widgets, and one or more sets of instructions or programs that execute to complete rebranding, customizing, and/or provisioning the mobile communication device.

17. The method of claim 13, wherein the customization application is Device Self Service (DSS).

18. The method of claim 13, wherein the first customization payload is identified in response to receiving the first alert string and is based on the first alert string received.

19. The method of claim 13, wherein the first alert string is selected from a plurality of alert strings, wherein each alert string of the plurality of alert strings is configured to request a different portion of the customization package.

* * * * *